United States Patent
Hao et al.

(10) Patent No.: US 12,380,567 B2
(45) Date of Patent: Aug. 5, 2025

(54) IMAGE PROCESSING

(71) Applicant: BEIJING BAIDU NETCOM SCIENCE TECHNOLOGY CO., LTD., Beijing (CN)

(72) Inventors: Yuying Hao, Beijing (CN); Yi Liu, Beijing (CN); Zewu Wu, Beijing (CN); Baohua Lai, Beijing (CN); Zeyu Chen, Beijing (CN); Dianhai Yu, Beijing (CN); Yanjun Ma, Beijing (CN); Zhiliang Yu, Beijing (CN); Xueying Lv, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 378 days.

(21) Appl. No.: 18/058,543

(22) Filed: Nov. 23, 2022

(65) Prior Publication Data
US 2023/0085732 A1    Mar. 23, 2023

(30) Foreign Application Priority Data

Nov. 26, 2021    (CN) .......................... 202111424250.4

(51) Int. Cl.
*G06T 7/11* (2017.01)
(52) U.S. Cl.
CPC ...... *G06T 7/11* (2017.01); *G06T 2207/20081* (2013.01); *G06T 2207/20084* (2013.01)
(58) Field of Classification Search
None
See application file for complete search history.

(56) References Cited

U.S. PATENT DOCUMENTS

2015/0297916 A1   10/2015   Chen et al.
2018/0204064 A1*   7/2018   Tran ........................ G06V 40/20

FOREIGN PATENT DOCUMENTS

| CN | 108010034 A | | 5/2018 |
|---|---|---|---|
| CN | 108230252 A | | 6/2018 |
| CN | 109754472 A | | 5/2019 |
| CN | 110610453 A | | 12/2019 |
| CN | 111179284 A | | 5/2020 |
| CN | 111666936 A | * | 9/2020 |
| CN | 113012134 A | * | 6/2021 |
| CN | 113096213 A | | 7/2021 |
| CN | 113361530 A | | 9/2021 |
| JP | 2019086899 A | * | 6/2019 |

\* cited by examiner

*Primary Examiner* — Delomia L Gilliard
(74) *Attorney, Agent, or Firm* — Seed IP Law Group LLP (57) ABSTRACT

The present disclosure provides an image processing method and apparatus, and relates to the field of image processing, and in particular to the field of image annotation. An implementation is: obtaining an image to be processed including a target region to be annotated; in response to a first click on the target region, performing a first operation to expand a predicted region for the target region based on a click position of the first click; in response to a second click in a position where the predicted region exceeds the target region, performing a second operation to reduce the predicted region based on a click position of the second click; and in response to determining that a difference between the predicted region and the target region meets a preset condition, obtaining an outline of the predicted region to annotate the target region.

20 Claims, 8 Drawing Sheets

IMAGE PROCESSING

CROSS REFERENCE TO RELATED APPLICATION

This application claims priority to Chinese Patent Application No. 202111424250.4, filed on Nov. 26, 2021, the contents of which are hereby incorporated by reference in their entirety for all purposes.

TECHNICAL FIELD

The present disclosure relates to the technical field of image processing, in particular to the field of image annotation, and specifically to an image processing method, an electronic device, a computer-readable storage medium.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include the technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

An existing image annotation method mainly relies on manual point selection and line drawing, and uses a closed curve to distinguish a selected object from a background.

The technical solutions described in this section are not necessarily technical solutions that have been previously conceived or employed. It should not be assumed that any of the technical solutions described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides an image processing method, an electronic device, a computer-readable storage medium.

According to an aspect of the present disclosure, there is provided an image processing method, the method including: obtaining an image to be processed including a target region to be annotated; in response to a first click on the target region, performing a first operation, where the first operation expands a predicted region for the target region based on a click position of the first click, and reduces an area of the target region that has not been covered by the predicted region; in response to a second click in a position where the predicted region exceeds the target region, performing a second operation, where the second operation is used to reduce the predicted region based on a click position of the second click, to reduce an area of the predicted region exceeding the target region; and in response to determining that a difference between the predicted region and the target region is less than a threshold, obtaining an outline of the predicted region to annotate the target region.

According to an aspect of the present disclosure, there is provided an electronic device, comprising: one or more processors; a memory storing one or more programs configured to be executed by the one or more processors, the one or more programs including instructions for: obtaining an image to be processed comprising a target region to be annotated; in response to a first click on the target region, performing a first operation, wherein the first operation expands a predicted region for the target region based on a click position of the first click, and reduces an area of the target region that has not been covered by the predicted region; in response to a second click in a position where the predicted region exceeds the target region, performing a second operation, wherein the second operation is used to reduce the predicted region based on a click position of the second click, to reduce an area of the predicted region exceeding the target region; and in response to determining that a difference between the predicted region and the target region is less than a threshold, obtaining an outline of the predicted region to annotate the target region.

According to an aspect of the present disclosure, there is provided a non-transitory computer-readable storage medium storing one or more programs, the one or more programs comprising instructions, which when executed by one or more processors of an electronic device, cause the electronic device to: obtaining an image to be processed comprising a target region to be annotated; in response to a first click on the target region, performing a first operation, wherein the first operation expands a predicted region for the target region based on a click position of the first click, and reduces an area of the target region that has not been covered by the predicted region; in response to a second click in a position where the predicted region exceeds the target region, performing a second operation, wherein the second operation is used to reduce the predicted region based on a click position of the second click, to reduce an area of the predicted region exceeding the target region; and in response to determining that a difference between the predicted region and the target region is less than a threshold, obtaining an outline of the predicted region to annotate the target region.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings exemplarily show embodiments and form a part of the specification, and are used to explain example implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION OF EMBODIMENTS

Example embodiments of the present disclosure are described below with reference to the accompanying drawings, where various details of the embodiments of the present disclosure are included for a better understanding, and should be considered as merely example. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

The embodiments of the present disclosure will be described below in detail with reference to the accompanying drawings.

Figure 1:
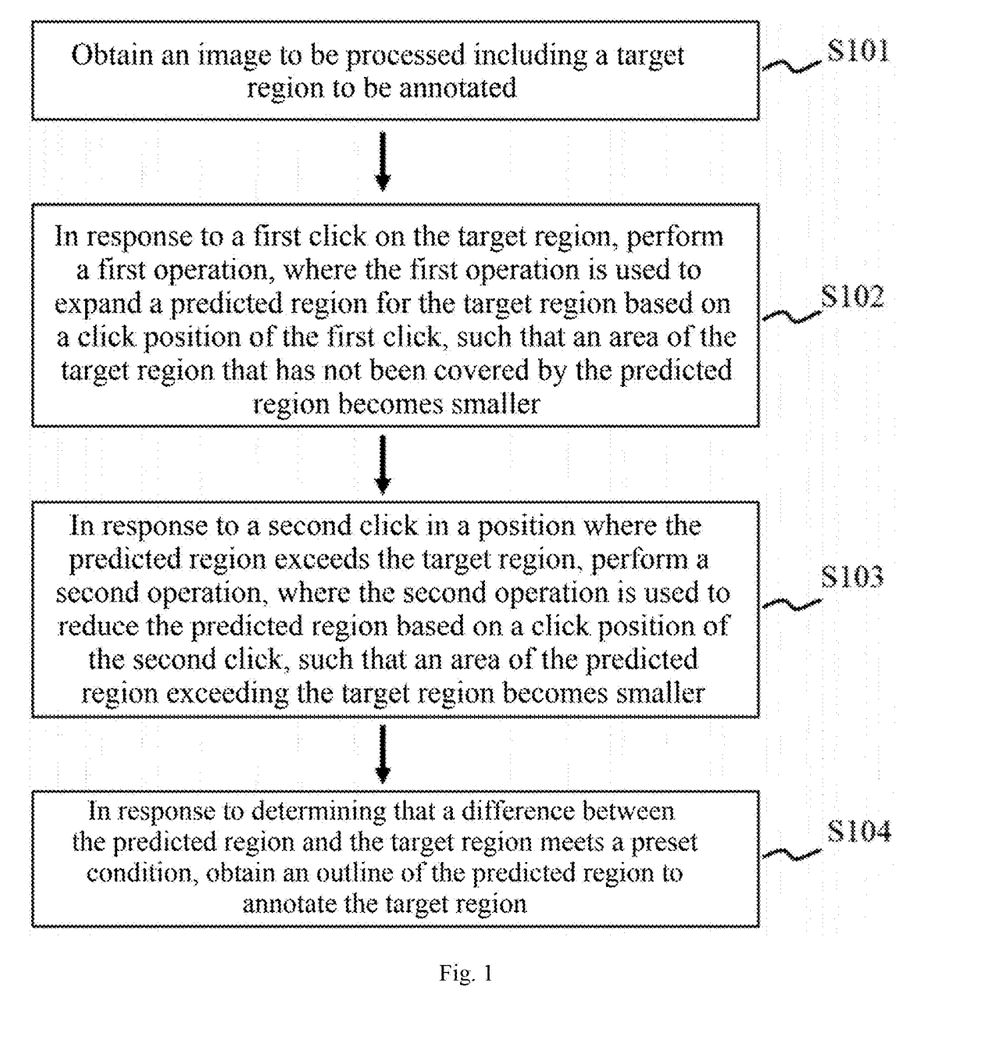
FIG. 1 is a flowchart of an image processing method according to an embodiment of the present disclosure.

FIG. 1 is a flowchart of an image processing process according to an example embodiment of the present disclosure.

As shown in FIG. 1, the process includes: step S101: obtaining an image to be processed including a target region to be annotated; step S102: in response to a first click on the target region, performing a first operation, where the first operation is used to expand a predicted region for the target region based on a click position of the first click, such that an area of the target region that has not been covered by the predicted region becomes smaller; step S103: in response to a second click in a position where the predicted region exceeds the target region, performing a second operation, where the second operation is used to reduce the predicted region based on a click position of the second click, such that an area of the predicted region exceeding the target region becomes smaller; and step S104: in response to determining that a difference between the predicted region and the target region is less than a threshold, obtaining an outline of the predicted region to annotate the target region.

Through the techniques, a user can efficiently and accurately annotate an image with a few clicks. Compared with the prior art, the user no longer needs to manually annotate an object with a large number of points along an outline of the object to be annotated, and can complete the annotation by clicking in an unspecified position on the image, which reduces both the number of points that the annotation requires and a requirement for user click accuracy, thereby greatly improving the efficiency. According to the method in this embodiment of the present disclosure, the user only needs to make one click on the object expected to be annotated, such that a predicted region intended to cover the object is automatically generated. Further, depending on a specific status of the predicted region, the user may further adjust the predicted region by performing a few click operations on a deviation region between the predicted region and the object to be annotated, such that a deviation between the predicted region and the object to be annotated meets an annotation requirement.

Generally, the image to be processed is composed of a foreground region (e.g., the target region) and a background region. A part of the image to be processed that exceeds the target region may also be considered to be a part of the background region. The target region may be an entirety of a plurality of objects of the same class (corresponding to "semantic segmentation"), or may be a single entity in the plurality of objects of the same class (corresponding to "instance segmentation"). For example, the target region may be all vehicles in the image, or may be a single vehicle in the image. The difference between the predicted region and the target region is a difference between areas of the two regions.

A click operation of the user on the image may be divided into two types. Specifically, a click point intended to expand the predicted region (i.e., within the target region corresponding to the object to be annotated) may be considered as a positive point, and a click point intended to reduce the predicted region (i.e., located in the background region) may be considered as a negative point. According to an implementation, the user inputs a positive point by clicking a left mouse button and inputs a negative point by clicking a right mouse button. In addition, to facilitate distinguishing, different colors may be used to distinguish between a positive point and a negative point in the image to be annotated. For example, a positive point may be represented by a green or black color, and a negative point may be represented by a red or white color. It may be understood that another method for distinguishing between the types of the click operations is also possible, which is not limited in the present disclosure. A click operation is used herein as an example user inputs on the image. Other ways of performing user inputs with respect to an image, like gestures and voice commands, are also possible and included in the scope of the disclosure The first click or the second click is performed through a user click. For example, when the user performs the click operation on the image through a device such as a mouse, a coordinate position where the mouse is clicked is picked up through a function. The picked-up coordinate position is taken as the center of a circle to obtain a circle with a radius of five pixel points, information about all pixel points in the circle is collected to generate a pixel point set, and the pixel point set is used for the first click or the second click.

The user may distinguish between the predicted region and the target region by displaying the predicted region in a single color without changing display of the target region, which, however, does not limit the present disclosure thereto. For example, the distinguishing may be implemented by changing transparency of the predicted region through parameter adjustment.

According to some embodiments, clicking is repeated to perform a corresponding first operation and/or second operation until it is determined that the difference between the predicted region and the target region meets the preset condition.

It can be seen that the number of clicks when the user annotates the object is not limited according to the method of the present disclosure. When the deviation between the predicted region and the target region does not meet the preset condition, the user may continuously adjust the predicted region through a plurality of subsequent clicks until a highly accurate annotation result is obtained.

According to some embodiments, the obtaining an outline of the predicted region to annotate the target region includes generating a polygon along the outline. For example, the polygon is generated along the obtained outline of the predicted region, and the polygon includes line segments and corner points.

In a scenario where a large number of linear edges exist, such as a building in a remote sensing image, the predicted region is displayed as a polygon, which can help the user more effectively compare the predicted region with the target region.

According to some embodiments, the polygon is adjusted by performing at least one of the following operations: adding a corner point to the polygon; deleting a corner point from the polygon; and dragging a corner point of the polygon. For example, the user drags a corner point of the polygon, such that a vector of a line segment changes as a position of the corner point changes, and if one corner point is dragged away from an adjacent corner point, a length of a line segment between the two points increases. By performing the operation, the difference between the predicted region and the target region is reduced.

In this manner, the user does not need to perform a complex operation, and can change the outline of the predicted region through three simple operations to implement a minor adjustment to the predicted region.

According to some embodiments, the image processing method further includes: exporting an annotation result for the target region in a JSON format or a COCO format. When the difference between the predicted region and the target region is less than the preset condition and the user wants to export the predicted region, the JSON format or the COCO format may be selected by the user to generate the annotation result for the target region in different formats, thereby meeting different requirements of the user for an annotation format and helping the user export the annotation result according to his own needs.

According to some embodiments, the obtaining an image to be processed includes: loading the annotation result to obtain the image to be processed including preceding annotation information.

In this manner, the image to be processed that has been annotated may be imported again, thereby enabling annotation to be performed again on the basis of the previous annotation result.

According to some embodiments, the user may choose whether to automatically save the annotation result without performing an operation to save the annotation result, thereby smoothing the annotation process.

According to some embodiments, a label may be added to the annotated target region, where the label can be exported for annotating a region of the same type as the target region in another image to be processed.

In this manner, a same label can be shared among different users, thereby facilitating a scenario of collaborative annotation. The user may choose to store the label in a storage device such as a hard disk and a cloud, and another user may access the storage device to obtain the label.

FIGS. 2A to 2E show an example of annotating an image according to an embodiment of the present disclosure. Referring to FIGS. 2A to 2E, a process through which a user completes image annotation by clicking will be described below.

Figure 2A:
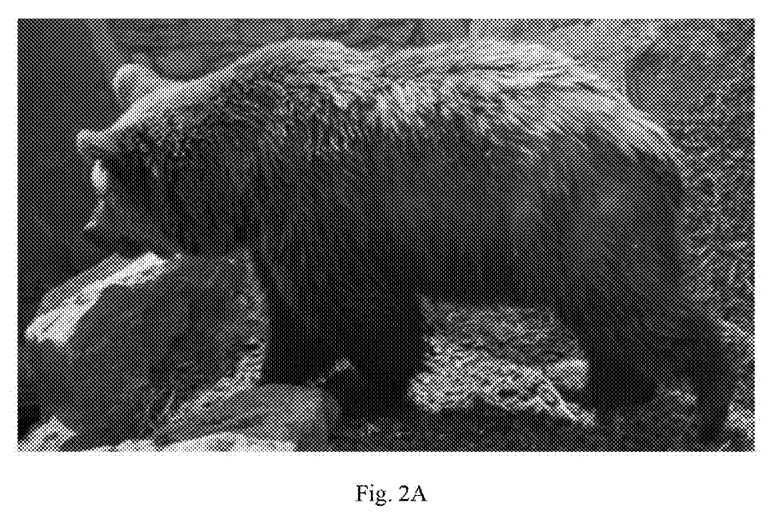
FIGS. 2A to 2E show an example of annotating an image according to an embodiment of the present disclosure.

As shown in FIG. 2A, the user imports an image to be processed. A target region to be annotated included in the image to be processed is a bear, and a region other than the bear is a background region. The user may click on the target region or the background region by moving a mouse cursor. As shown in FIGS. 2B to 2E, for example, if the user clicks a left mouse button, a black point P1 representing a positive point is generated in a position of the mouse cursor at this time. If the user clicks a right mouse button, a white point P2 representing a negative point is generated in a position of the mouse cursor at this time.

Figure 2B:
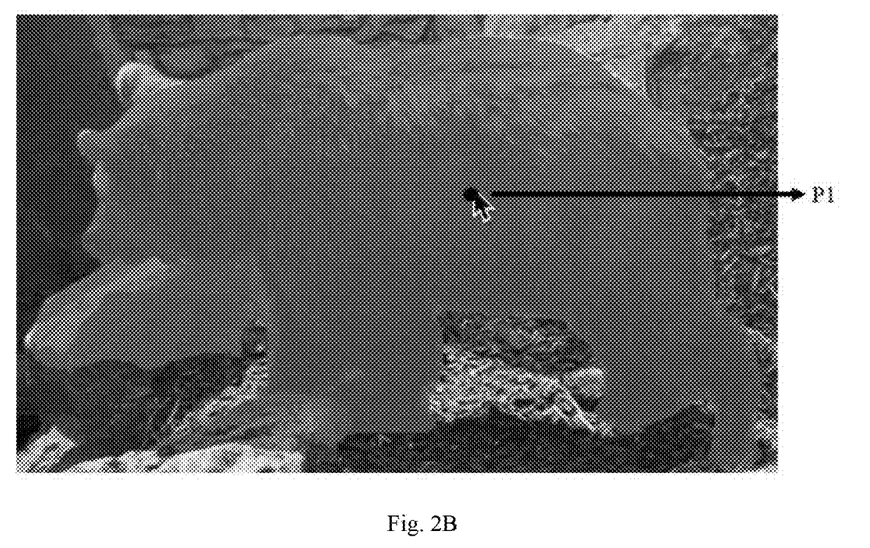

During the annotation, the mouse cursor is first moved to the target region of the bear, and the left mouse button is clicked to add the black point P1 representing a positive point, that is, a first click is performed.

As shown in FIG. 2B, in response to the first click performed by the user, a predicted region in gray shadow is generated. Most of the generated gray shadow overlaps the bear, that is, an area of the target region that has not been covered by the predicted region has become smaller compared with a state before the first click. It can be noted that at this time the predicted region in gray shadow includes a rock part under the bear head. Therefore, the rock part needs to be removed, that is, to reduce an area of the predicted region exceeding the target region.

Figure 2C:
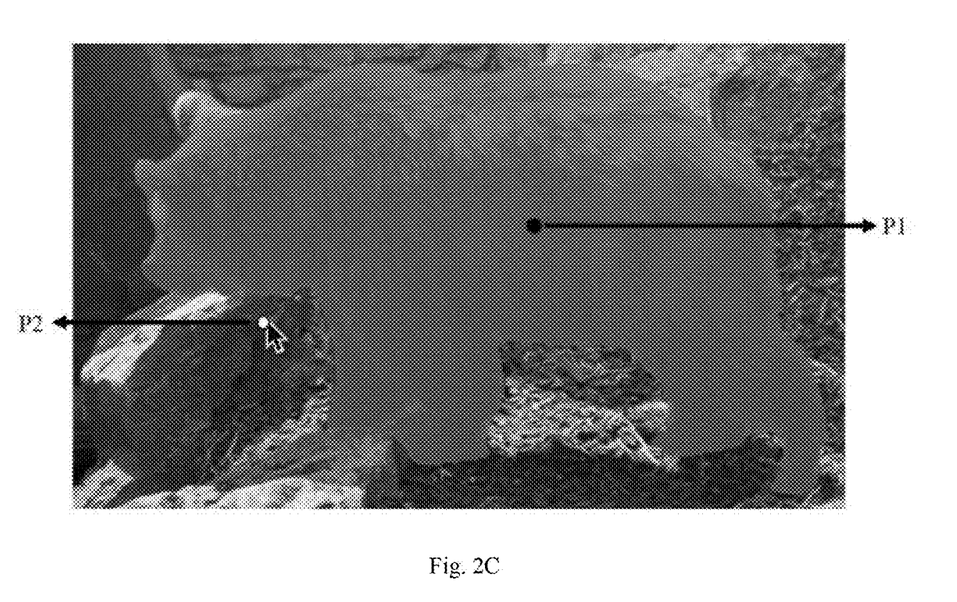

To this end, a second click is required. The mouse cursor is moved onto the rock part, and the right mouse button is clicked to add the white point P2 representing a negative point, that is, the second click is performed. As shown in FIG. 2C, in response to the second click, the predicted region in gray shadow is changed, that is, the rock part is removed from the gray shadow. It can be noted that at this time the predicted region in gray shadow does not include a right ear part of the bear.

Figure 2D:
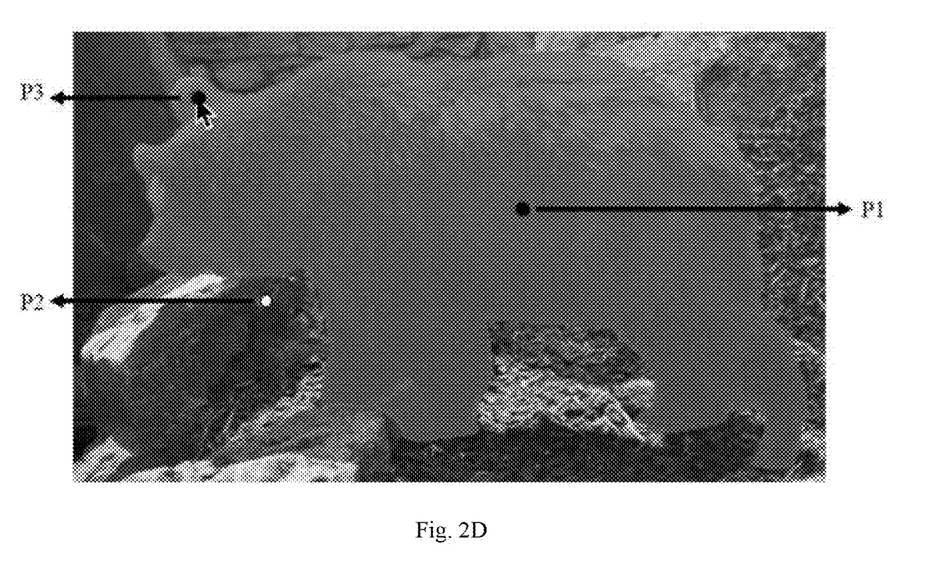

To make the gray shadow include the right ear part of the bear, the first click is required to be performed again. The user needs to add a positive point on the right ear of the bear. To this end, the user moves the mouse cursor onto the right ear of the bear and clicks the left mouse button to add a black point P3 representing a positive point, such that the first click is performed again. That is, clicking is repeated to perform a corresponding first operation.

As shown in FIG. 2D, in response to the first click performed again by the user, the predicted region in gray shadow is expanded to include the right ear of the bear. At this time, the predicted region in gray shadow substantially overlaps the target region, and in response to determining that a difference between the two meets a preset condition, the image annotation is completed. It should be noted that the embodiments described above based on FIGS. 2A to 2D are merely example, and the number of repetitions of the first operation and the second operation is not limited according to the method of the present disclosure. That is, the user may repeatedly click to perform a corresponding first operation and/or second operation until it is determined that the difference between the predicted region and the target region meets the preset condition.

Figure 2E:
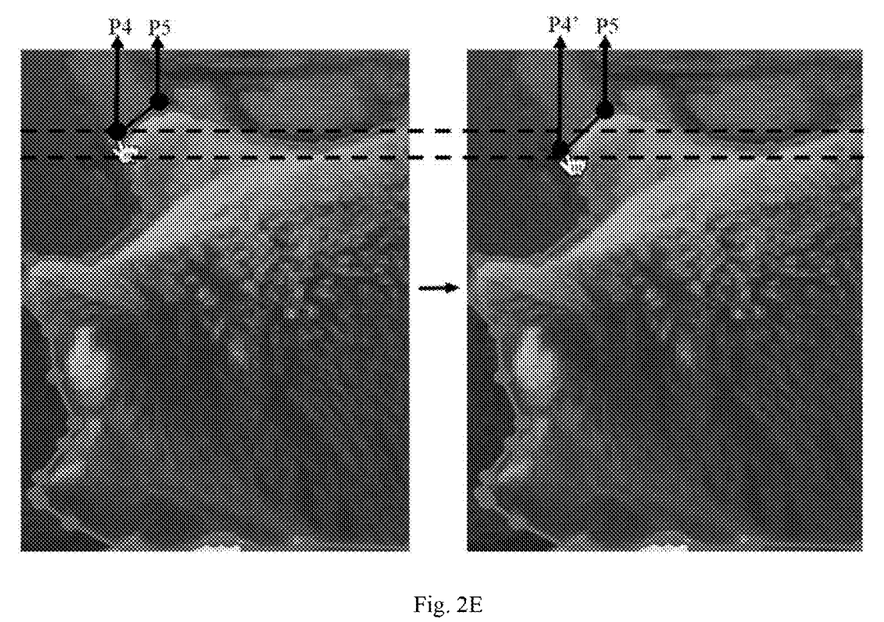

As show in FIG. 2E, a polygon is generated along an outline of the predicted region, where a gray dotted line composed of corner points and line segments is formed at an intersection of the bear and the background region. Each corner point may be dragged to perform a minor adjustment on the polygon. In addition, a corner point may be added to or deleted from the polygon.

FIG. 2E depicts, as an example, a case of dragging a corner point. To aid understanding, two black dashed lines are added into the figure to indicate a positional change in the height direction at corner points P4 (before dragging) and P4' (before and after dragging). As show in FIG. 2E, in the height direction, the corner point P4 above a dashed line is dragged to P4' below a dashed line, and accordingly, a dotted line between each of the corner points P4 and P4' and its corresponding connection corner point P5 also changes (for clarity of illustration, related gray line segments are presented in black), such that the outline of the predicted region changes. The user adjusts the polygon by dragging the corner point of the polygon, such that the polygon more closely matches the target region.

Figure 3:
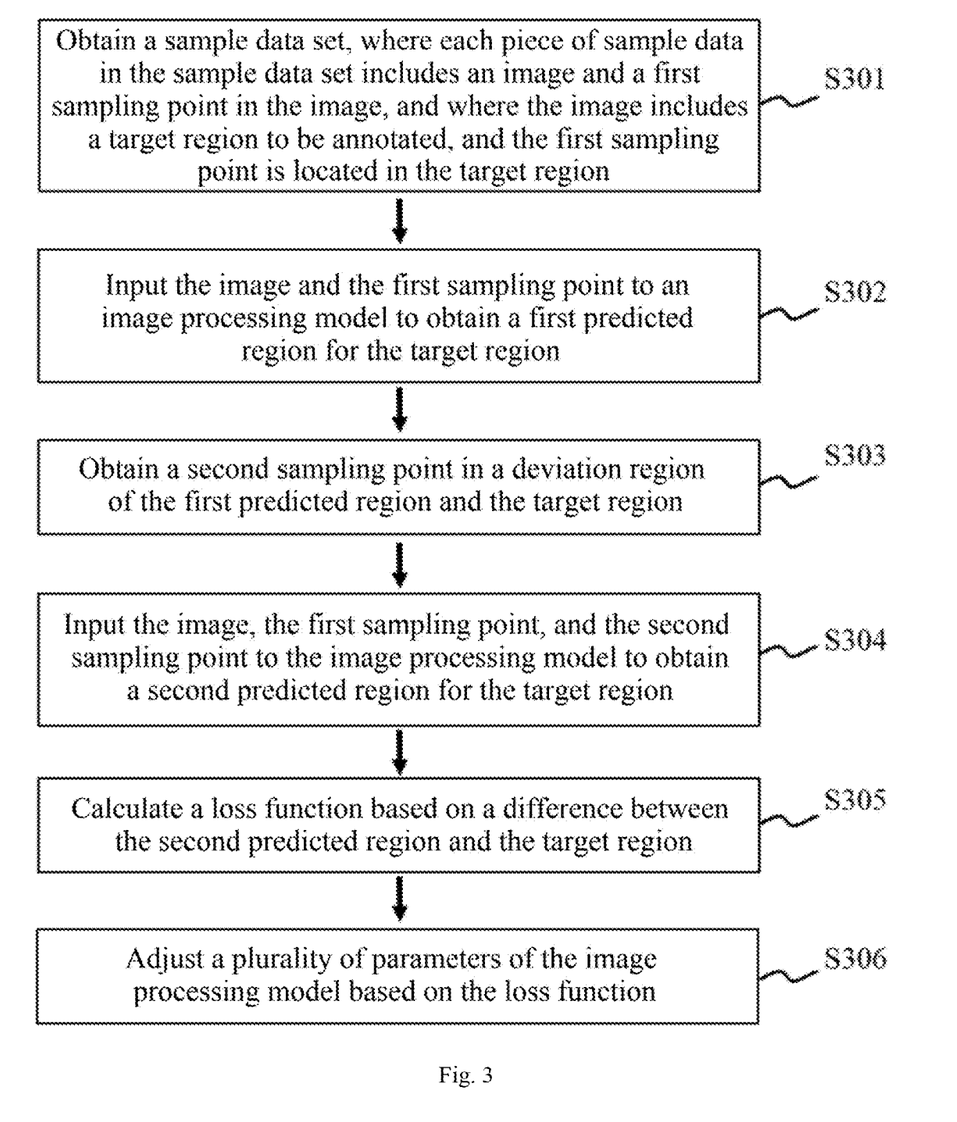
FIG. 3 is a flowchart of a training method for an image processing model according to an embodiment of the present disclosure.

FIG. 3 is a flowchart of a training method for an image processing model according to an example embodiment.

As shown in FIG. 3, the training the image processing model includes: step 301: obtaining a sample data set, where each piece of sample data in the sample data set includes an image and a first sampling point in the image, and where the image includes a target region to be annotated, and the first sampling point is located in the target region; and for obtaining each piece of sample data in the sample data set, performing the following operations: step 302: inputting the image and the first sampling point to the image processing model to obtain a first predicted region for the target region; step 303: obtaining a second sampling point in a deviation region of the first predicted region and the target region; step 304: inputting the image, the first sampling point, and the second sampling point to the image processing model to obtain a second predicted region for the target region; step 305: calculating a loss function based on a difference between the second predicted region and the target region; and step 306: adjusting a plurality of parameters of the image processing model based on the loss function.

According to some embodiments, the sample data set may select training data for image segmentation, such as a Berkeley dataset, and the image processing model may be based on a HRNet+OCR model.

According to an implementation, the first sampling point and/or the second sampling point may be input to the image processing model in a form of a distance map together with the image included in the sample data. For the image included in each piece of sample data, a positive point distance map and a negative point distance map may be set. The positive point distance map and the negative point distance map each have a same size as the image corresponding thereto. A difference lies in that, in the positive point distance map, only values in one or more positions corresponding to one or more sampled positive points are 1, and the rest of values are all 0; correspondingly, in the negative point distance map, only values in one or more positions corresponding to one or more sampled negative points are 1, and the rest of values are all 0.

According to an implementation, the first sampling point may include only a positive point. Thus, during encoding of the first sampling point, only values on the corresponding positive point distance map change, while values on the negative point distance map are 0. For example, if the first sampling point includes one positive point, a value in a position corresponding to the positive point on the positive point distance map becomes 1; correspondingly, if the first sampling point includes a plurality of positive points, for example, 24 positive points, values in positions corresponding to the 24 positive points on the positive point distance map become 1.

Based on the first sampling point, the first forward propagation in the training process is completed. It should be noted that an input for implementing the first forward propagation includes the image in the sample data (i.e., an original image), the positive point distance map, and the negative point distance map. For example, when there is no negative point as the sampling point, the values on the negative point distance map are all 0.

According to an implementation, based on RGB vectors corresponding to the original image, the positive point distance map, and the negative point distance map, input vectors including five channels of three-dimensional vectors are obtained and input to the image processing model to perform the first forward propagation and obtain the first predicted region.

According to some embodiments, the second sampling point is obtained in a position where the first predicted region exceeds the target region.

Making the second sampling point composed of a negative point adds training data about the negative point, strengthens a capability of the pre-trained image processing model to respond to the negative point, and improves a generalization capability of the model.

Since the first predicted region erroneously includes a region other than the target region, the second sampling point is composed of the negative point to reduce an area of the first predicted region exceeding the target region. In this case, the positive point distance map remains unchanged, and the values on the negative point distance map change in response to the newly added negative point as the second sampling point. Subsequently, based on the RGB vectors corresponding to the original image, the positive point distance map, and the updated negative point distance map, input vectors including five channels of three-dimensional vectors are obtained and input to the image processing model to perform the second forward propagation and obtain the second predicted region.

Based on the difference between the second predicted region and the target region, a back propagation is performed to adjust the plurality of parameters of the model. It can be seen that according to the training method of the present disclosure, two forward propagations and one back propagation are included in the training process based on one piece of sample data.

According to some embodiments, the second sampling point is obtained in a position where the first predicted region does not cover the target region.

Making the second sampling point composed of a positive point adds training data about the positive point, further strengthens a capability of the pre-trained image processing model to respond to the positive point, and improves the accuracy of the predicted region that responds to the positive point.

Since the first predicted region fails to cover the target region, the second sampling point is composed of the positive point to increase an area of the first predicted region covering the target region. In this case, the values on the positive point distance map change in response to the newly added positive point as the second sampling point. Since neither the first sampling point nor the second sampling point includes a negative point, the values on the negative point distance map stay at an initial value, that is, zero. Subsequently, based on the RGB vectors corresponding to the original image, the updated positive point distance map, and the negative point distance map, input vectors including five channels of three-dimensional vectors are obtained and input to the image processing model to perform the second forward propagation and obtain the second predicted region. Based on the difference between the second predicted region and the target region, the back propagation is performed to adjust the plurality of parameters of the model.

According to some embodiments, the first sampling point and the second sampling point are randomly obtained based on a ground truth image corresponding to the target region. The ground truth image corresponding to the target region is known before the model training and is used to clearly distinguish the target region to be annotated from a background region in the image.

Before the first sampling point is obtained, the ground truth image corresponding to the target region may be eroded, for example, ¼ of an original ground truth image is eroded, and the first sampling point may be randomly selected in an eroded region. The first sampling point may be one positive point, or may include a plurality of positive points. In addition, before the second sampling point is obtained, image erosion may be performed on a deviation region of the predicted region and the ground truth image, and the second sampling point may be randomly selected in an eroded region, where the number of second sampling points is preferably 1. Randomly selecting the points in the eroded regions can improve the robustness of a system.

According to some embodiments, the method may be used to train two pre-trained models, one of which is a high-accuracy model and the other is a lightweight model, and both of which are used to implement different performance due to different numbers of parameters. For different models, an area of a predicted region generated in response to a mouse click is also different. For example, in the high-accuracy model, the area of the predicted region generated with the mouse click changes slightly, such that instance segmentation may be implemented. Correspondingly, in the lightweight model, the area of the predicted region generated with the mouse click changes significantly, such that semantic segmentation is performed with a high efficiency.

According to some embodiments, a model applicable to a plurality of scenarios such as a general scenario, a portrait scenario, remote sensing, and autonomous driving is provided by adjusting values of parameters of the model. Thus, the user may select the model according to needs to meet requirements of different user usage scenarios.

According to some embodiments, the image to be processed is preprocessed, for example, when block noise exists in the image to be processed, it is preferable to directly mask discrete block noise regions, reserving only a maximum connected region. The noise regions and the maximum connected region may be obtained by edge detection and a maximum between-cluster variance.

Figure 4:
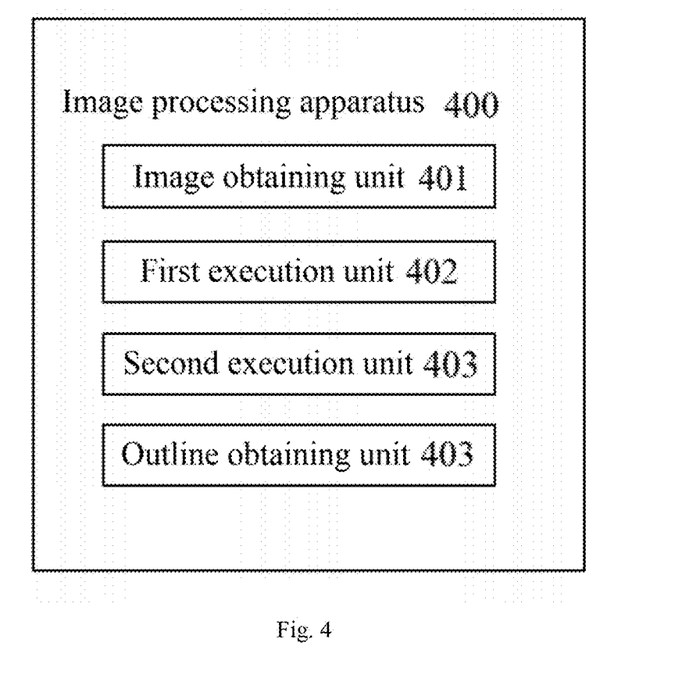
FIG. 4 is a block diagram of an image processing apparatus according to an embodiment of the present disclosure.

According to an aspect of the present disclosure, there is further disclosed an image processing apparatus 400, the apparatus including: an image obtaining unit 401 configured to obtain an image to be processed including a target region to be annotated; a first execution unit 402 configured to: in response to a first click on the target region, perform a first operation, where the first operation is used to expand a predicted region for the target region based on a click position of the first click, such that an area of the target region that has not been covered by the predicted region becomes smaller; a second execution unit 403 configured to: in response to a second click in a position where the predicted region exceeds the target region, perform a second operation, where the second operation is used to reduce the predicted region based on a click position of the second click, such that an area of the predicted region exceeding the target region becomes smaller; and an outline obtaining unit 404 configured to: in response to determining that a difference between the predicted region and the target region meets a preset condition, obtain an outline of the predicted region to annotate the target region.

Figure 5:
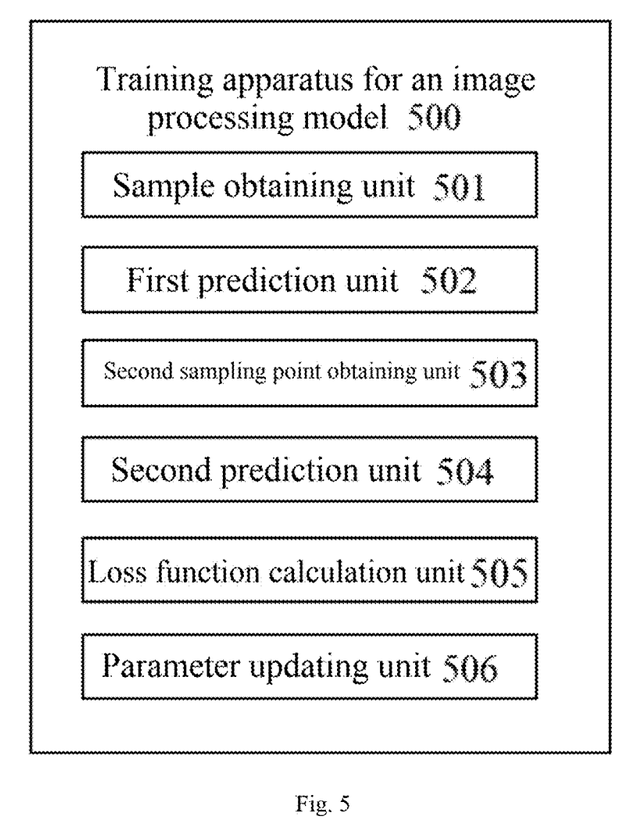
FIG. 5 is a block diagram of a training apparatus for an image processing model according to an embodiment of the present disclosure.

According to an aspect of the present disclosure, there is further disclosed a training apparatus 500 for an image processing model, the apparatus including: a sample obtaining unit 501 configured to obtain a sample data set, where each piece of sample data in the sample data set includes an image and a first sampling point in the image, and where the image includes a target region to be annotated, and the first sampling point is located in the target region; a first prediction unit 502 configured to input the image and the first sampling point to the image processing model to obtain a first predicted region for the target region; a second sampling point obtaining unit 503 configured to obtain a second sampling point in a position where the first predicted region exceeds the target region; a second prediction unit 504 configured to input the image, the first sampling point, and the second sampling point to the image processing model to obtain a second predicted region for the target region; a loss function calculation unit 505 configured to calculate a loss function based on a difference between the second predicted region and the target region; and a parameter updating unit 506 configured to adjust a plurality of parameters of the image processing model based on the loss function.

According to an aspect of the present disclosure, there is further disclosed an electronic device, including: at least one processor; and a memory communicatively connected to the at least one processor, where the memory stores instructions executable by the at least one processor, and when executed by the at least one processor, the instructions cause the at least one processor to perform the method described above.

According to an aspect of the present disclosure, there is further disclosed a non-transitory computer-readable storage medium storing computer instructions, where the computer instructions are used to cause a computer to perform the method described above.

According to an aspect of the present disclosure, there is further disclosed a computer program product, including a computer program, where when the computer program is executed by a processor, the method described above is implemented.

Figure 6:
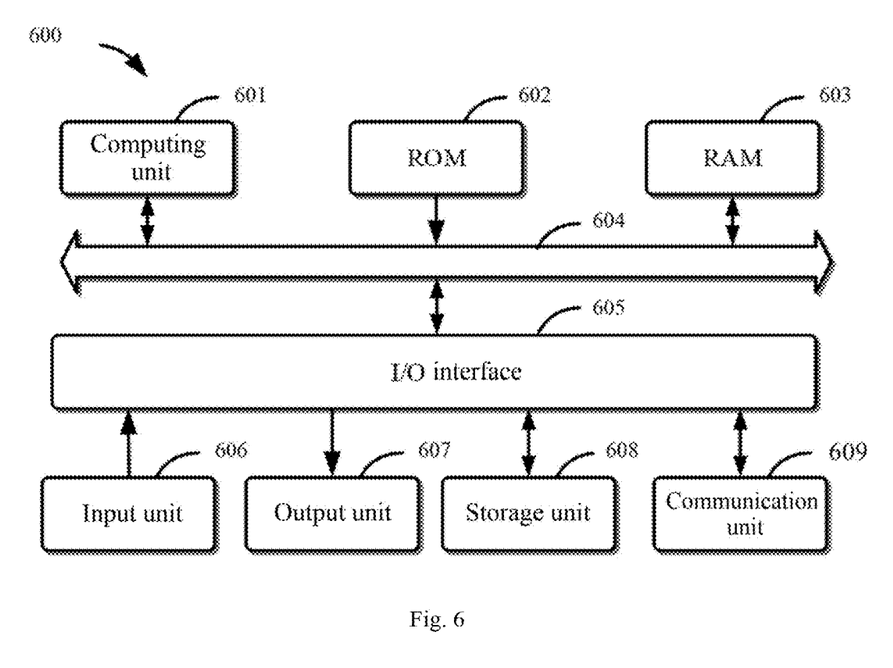
FIG. 6 is a structural block diagram of an example electronic device that can be used to implement an embodiment of the present disclosure.

Referring to FIG. 6, a structural block diagram of an electronic device 600 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 6, the electronic device 600 includes a computing unit 601, which may perform various appropriate actions and processing according to a computer program stored in a read-only memory (ROM) 602 or a computer program loaded from a storage unit 608 to a random access memory (RAM) 603. The RAM 603 may further store various programs and data required for the operation of the electronic device 600. The computing unit 601, the ROM 602, and the RAM 603 are connected to each other through a bus 604. An input/output (I/O) interface 605 is also connected to the bus 604.

A plurality of components in the electronic device 600 are connected to the I/O interface 605, including: an input unit 606, an output unit 607, the storage unit 608, and a communication unit 609. The input unit 606 may be any type of device capable of entering information to the electronic device 600. The input unit 606 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 607 may be any type of device capable of presenting information, and may include, but is not limited to, a display, a speaker, a video/audio output terminal, a vibrator, and/or a printer. The storage unit 608 may include, but is not limited to, a magnetic disk and an optical disc. The communication unit 609 allows the electronic device 600 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, an 802.11 device, a Wi-Fi device, a WiMAX device, a cellular communication device, and/or the like.

The computing unit 601 may be various general-purpose and/or special-purpose processing components with processing and computing capabilities. Some examples of the computing unit 601 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 601 performs the various methods and processing described above, for example, the image processing method. For example, in some embodiments, the image processing method may be implemented as a computer software program, which is tangibly contained in a machine-readable medium, such as the storage unit 608. In some embodiments, a part or all of the computer program may be loaded and/or installed onto the electronic device 600 via the ROM 602 and/or the communication unit 609. When the computer program is loaded onto the RAM 603 and executed by the computing unit 601, one or more steps of the image processing method described above can be performed. Alternatively or additionally, in other embodiments, the computing unit 601 may be configured, by any other suitable means (for example, by means of firmware), to perform the image processing method.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely example embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. An image processing method, the method comprising:
   obtaining an image to be processed that includes a target region to be annotated;
   in response to a first click on the target region, performing a first operation, wherein the first operation expands a predicted region for the target region based on a click position of the first click, and reduces an area of the target region that has not been covered by the predicted region;
   in response to a second click on a position where the predicted region exceeds the target region, performing a second operation, wherein the second operation reduces the predicted region based on a click position of the first click a click position of the second click, and reduces an area of the predicted region exceeding the target region; and
   in response to determining that a difference between the predicted region and the target region is less than a threshold, obtaining an outline of the predicted region to annotate the target region,
   wherein the first operation includes:
      inputting the click position of the first click and the image to an image processing model, wherein the image processing model is trained with sample data including a sample image and a target region in the sample image; and
      obtaining an expanded predicted region output by the image processing model, and
   wherein the second operation includes:
      inputting the click position of the first click, the click position of the second click and the image to the image processing model; and
      obtaining a reduced predicted region output by the image processing model.

2. The method according to claim 1, further comprising:
   in response to repeated clicks, repeatedly performing operations comprising at least one of: the first operation and the second operation, until it is determined that the difference between the predicted region and the target region is less than the threshold.

3. The method according to claim 1, wherein the obtaining the outline of the predicted region to annotate the target region comprises generating a polygon along the outline.

4. The method according to claim 3, further comprising:
   adjusting the polygon by performing at least one of following operations:
      adding a corner point to the polygon;
      deleting a corner point from the polygon; and
      dragging a corner point of the polygon.

5. The method according to claim 1, further comprising:
   exporting an annotation result for the target region in a JSON format or a COCO format.

6. The method according to claim 5, wherein the obtaining the image to be processed comprises:
   loading the annotation result to obtain the image to be processed that includes preceding annotation information.

7. The method according to claim 1, further comprising:
   adding a label to the target region that has been annotated, wherein the label is exportable for annotating a region of a same type as the target region in another image to be processed.

8. The method according to claim 1, wherein the first operation and the second operation are performed by an image processing model, and wherein the image processing model is trained through acts including:
   obtaining a sample data set, wherein each piece of sample data in the sample data set comprises an image and a first sampling point in the image, and wherein the image comprises a target region to be annotated, and the first sampling point is located in the target region;
   for each piece of sample data, performing following operations:
      inputting the image and the first sampling point to the image processing model to obtain a first predicted region for the target region;
      obtaining a second sampling point in a deviation region of the first predicted region and the target region;
      inputting the image, the first sampling point, and the second sampling point to the image processing model to obtain a second predicted region for the target region;
      calculating a loss function based on a difference between the second predicted region from the target region; and
      adjusting a plurality of parameters of the image processing model based on the loss function.

9. The method according to claim 8, wherein the obtaining the second sampling point in the deviation region of the first predicted region from the target region comprises:
   obtaining the second sampling point in a position where the first predicted region exceeds the target region.

10. The method according to claim 8, wherein the obtaining the second sampling point in the deviation region of the first predicted region from the target region comprises:

obtaining the second sampling point in a position where the target region exceeds the first predicted region.

11. The method according to claim 8, wherein the first sampling point and the second sampling point are randomly obtained based on a ground truth image corresponding to the target region.

12. An electronic device, comprising:
one or more processors;
a memory storing one or more programs configured to be executed by the one or more processors, the one or more programs including instructions for:
obtaining an image to be processed that includes a target region to be annotated;
in response to a first click on the target region, performing a first operation, wherein the first operation expands a predicted region for the target region based on a click position of the first click, and reduces an area of the target region that has not been covered by the predicted region;
in response to a second click on a position where the predicted region exceeds the target region, performing a second operation, wherein the second operation reduces the predicted region based on a click position of the second click, and reduces an area of the predicted region exceeding the target region; and
in response to determining that a difference between the predicted region and the target region is less than a threshold, obtaining an outline of the predicted region to annotate the target region,
wherein the first operation includes:
inputting the click position of the first click and the image to an image processing model, wherein the image processing model is trained with sample data including a sample image and a target region in the sample image; and
obtaining an expanded predicted region output by the image processing model, and
wherein the second operation includes:
inputting the click position of the first click, the click position of the second click and the image to the image processing model; and
obtaining a reduced predicted region output by the image processing model.

13. The electronic device according to claim 12, wherein the one or more programs further comprising instructions for:
in response to repeated clicks, repeatedly performing operations comprising at least one of: the first operation and the second operation, until it is determined that the difference between the predicted region and the target region is less than the threshold.

14. The electronic device according to claim 12, wherein the obtaining the outline of the predicted region to annotate the target region comprises generating a polygon along the outline.

15. The electronic device according to claim 14, wherein the one or more programs further comprising instructions for:
adjusting the polygon by performing at least one of following operations:
adding a corner point to the polygon;
deleting a corner point from the polygon; and
dragging a corner point of the polygon.

16. The electronic device according to claim 12, wherein the one or more programs further comprising instructions for:
exporting an annotation result for the target region in a JSON format or a COCO format.

17. The electronic device according to claim 16, wherein the obtaining the image to be processed comprises:
loading the annotation result to obtain the image to be processed that includes preceding annotation information.

18. The electronic device according to claim 12, wherein the one or more programs further comprising instructions for:
adding a label to the target region that has been annotated, wherein the label is exportable for annotating a region of a same type as the target region in another image to be processed.

19. A non-transitory computer-readable storage medium storing one or more programs, the one or more programs comprising instructions, which when executed by one or more processors of an electronic device, cause the electronic device to:
obtaining an image to be processed that includes a target region to be annotated;
in response to a first click on the target region, performing a first operation, wherein the first operation expands a predicted region for the target region based on a click position of the first click, and reduces an area of the target region that has not been covered by the predicted region;
in response to a second click on a position where the predicted region exceeds the target region, performing a second operation, wherein the second operation reduces the predicted region based on a click position of the second click, and reduces an area of the predicted region exceeding the target region; and
in response to determining that a difference between the predicted region and the target region is less than a threshold, obtaining an outline of the predicted region to annotate the target region,
wherein the first operation includes:
inputting the click position of the first click and the image to an image processing model, wherein the image processing model is trained with sample data including a sample image and a target region in the sample image; and
obtaining an expanded predicted region output by the image processing model, and
wherein the second operation includes:
inputting the click position of the first click, the click position of the second click and the image to the image processing model; and
obtaining a reduced predicted region output by the image processing model.

20. The storage medium according to claim 19, wherein the one or more programs further comprising instructions cause the electronic device to:
in response to repeated clicks, repeatedly performing operations comprising at least one of: the first operation and the second operation, until it is determined that the difference between the predicted region and the target region is less than the threshold.

* * * * *